United States Patent
Dearmitt et al.

(10) Patent No.: US 8,470,911 B2
(45) Date of Patent: Jun. 25, 2013

(54) PROCESS FOR COAGULATION OF AQUEOUS POLYMER DISPERSIONS

(75) Inventors: Chris Dearmitt, Hattiesburg, MS (US); Graham Edmund McKee, Neustadt (DE); Konrad Mitulla, Ludwigshafen (DE)

(73) Assignee: Styrolution GmbH (DE)

( * ) Notice: Subject to any disclaimer, the term of this patent is extended or adjusted under 35 U.S.C. 154(b) by 1144 days.

(21) Appl. No.: 12/295,559

(22) PCT Filed: Apr. 3, 2007

(86) PCT No.: PCT/EP2007/053236
§ 371 (c)(1),
(2), (4) Date: Sep. 30, 2008

(87) PCT Pub. No.: WO2007/113297
PCT Pub. Date: Oct. 11, 2007

(65) Prior Publication Data
US 2009/0062448 A1    Mar. 5, 2009

(30) Foreign Application Priority Data
Apr. 6, 2006   (EP) ..................................... 06112319

(51) Int. Cl.
*C08C 1/08*   (2006.01)
*C08K 3/00*   (2006.01)

(52) U.S. Cl.
USPC ........... 523/335; 524/424; 524/556; 524/571; 524/577

(58) Field of Classification Search
USPC ........... 524/119, 424, 571, 556, 577; 523/335
See application file for complete search history.

(56) References Cited

U.S. PATENT DOCUMENTS

| | | | |
|---|---|---|---|
| 3,727,775 A | | 4/1973 | Beazley |
| 4,286,081 A | * | 8/1981 | Mikofalvy et al. ............. 526/74 |
| 4,547,377 A | * | 10/1985 | Ogawa et al. ................. 426/268 |
| 5,633,220 A | * | 5/1997 | Cawiezel et al. ............. 507/117 |
| 2004/0102564 A1 | | 5/2004 | Guntherberg et al. |
| 2006/0116454 A1 | * | 6/2006 | Erdem et al. ................... 524/119 |
| 2006/0134428 A1 | * | 6/2006 | Miyazaki et al. .......... 428/411.1 |

FOREIGN PATENT DOCUMENTS

| | | |
|---|---|---|
| DE | 4408213 | 9/1995 |
| EP | 0423759 | 4/1991 |
| WO | WO-0242347 | 5/2002 |

OTHER PUBLICATIONS

G. Jander, E. Blasius: "Lehrbuch der analytischen und praparativen anorganischen Chemie, 10. Auflage"; 1976, S. Hirzel Verlag, Stuttgart, XP002438725, p. 28 last paragraph-p. 29, paragraph 1, p. 21, paragraph 2-paragraph 2, p. 248; table.

* cited by examiner

*Primary Examiner* — Hannah Pak
(74) *Attorney, Agent, or Firm* — Novak Druce Connolly Bove + Quigg LLP

(57) ABSTRACT

A process is proposed for coagulation of an aqueous polymer dispersion, which comprises, during or after the coagulation, converting the dissolved coagulation salt into an insoluble form.

18 Claims, No Drawings

PROCESS FOR COAGULATION OF AQUEOUS POLYMER DISPERSIONS

CROSS REFERENCE TO RELATED APPLICATIONS

This application is a National Phase filing under 35 U.S.C. §371 of PCT/EP2007/053236 filed Apr. 3, 2007, which claims priority to patent application Ser. No. 061123196.6, filed in Europe on Apr. 6, 2006. The entire contents of each of the above-application are incorporated herein by reference.

The invention relates to a process, with the aid of soluble coagulation salts, for coagulation of an aqueous polymer dispersion stabilized via one or more dispersing agents. The invention moreover relates to molding compositions which comprise these coagulated polymers.

Many polymers are prepared via homo- or copolymerization of suitable monomers in a liquid, for example via emulsion polymerization, miniemulsion polymerization, or microsuspension polymerization. In these processes, the polymer is produced in the form of a mostly aqueous solids dispersion, from which the polymer has to be isolated, unless the intention is to use the dispersion per se. The isolation of the polymers from the dispersion is usually achieved via coagulation. For this there is a variety of known processes.

For example, dispersions can be coagulated via addition of strong electrolytes. This process mostly uses salts which comprise polyvalent cations, such as $Ca^{2+}$, $Mg^{2+}$ or $Al^{3+}$. The coagulated polymer dispersion is further processed via partial removal of the water, for example by means of sieving, filtering, centrifuging, or decanting, and the water content of the polymer dispersion after this is still up to 60%. The water content can be further lowered via various drying methods, e.g. via warm air, heating in vacuo, or extrusion drying.

A disadvantage of these processes is that the water to be removed is polluted with the salts added to bring about coagulation, and the water removed therefore requires subsequent complicated purification.

The person skilled in the art is aware of coagulation methods which initiate coagulation of polymer dispersions without addition of salts, an example being the use of high shear forces (shear precipitation), or freezing (freeze coagulation). However, these processes require complicated apparatus and are expensive.

In contrast, it was an object of the present invention to provide an economic process for coagulation of aqueous polymer dispersions with the aid of coagulation salts while reducing the cost of subsequent treatment of the wastewater and keeping apparatus requirements at a low level.

The object is achieved by a process, with the aid of coagulation salts, for coagulation of an aqueous polymer dispersion stabilized via one or more dispersing agents, which comprises, during or after the coagulation, converting the coagulation salts from a dissolved form to an insoluble form.

Because the dissolved coagulation salt is converted into an insoluble salt, it takes the form of a fine dispersion in the coagulated dispersion. This also avoids any possible formation of relatively large particles composed of precipitated, possibly water-soluble and hygroscopic, coagulation salt during the further processing of the dispersion after coagulation. The coagulation salt converted into an insoluble salt remains in the polymers during removal of the wastewater, and there is no longer any need for purification of the wastewater to remove the coagulation salt. The salt can moreover serve as filler.

In order that the salt precipitates in aqueous solution, it has to have a very low solubility product. This also means that it is non-hygroscopic, the final product therefore being stable with respect to water.

The invention is described below:

Typically, the polymers of the polymer dispersions are prepared from monomers such as butadiene, isoprene, styrene and its derivatives, vinyl chloride, unsaturated fatty acids and their derivatives (acrylates, methacrylates, epoxides, amides, anhydrides), acrylonitrile, methacrylonitrile, alkyl acrylates, methyl acrylates, and mixtures of these. It is preferable to prepare a polymer in the polymer dispersion composed of butyl acrylate, ethylhexyl acrylate, or butadiene. The polymers can be crosslinked or linear polymers. The polymer particles can be homogeneous or can have a core-shell structure.

Typical dispersions can be prepared via any of the polymerization mechanisms, such as free-radical (ATRP, RAFT, CRP), anionic, or cationic polymerization, group-transfer polymerization, metathesis, or ROMP. The dispersion medium in the present process is water, which can comprise other substances, such as methanol, ethanol, or propanol. The dispersions can be prepared by way of emulsion polymerization, miniemulsion polymerization, suspension polymerization, or dispersion polymerization.

The polymer dispersions are stabilized sterically or electrostatically. It is possible to use anionic, cationic, nonionic, and amphoteric surfactants to stabilize the polymer dispersion. In particular, anionic surfactants, and mixtures composed of anionic and nonionic surfactants, are preferred. Typical examples of surfactants can be found in the literature (e.g. Surfactant Science and technology, Second Edition, Drew Meyers, 1992 VCH Publishers Inc. New York, USA, pp. 27-79).

Once the polymer dispersion has been prepared, it is coagulated with the aid of strong electrolytes. Typical examples of salt-like coagulants can be found in Introduction to Colloid and Surface Chemistry, $4^{th}$ Edition, Duncan J. Shaw, Butterworth-Heinemann Ltd. Oxford UK, 1991, page 211.

According to the invention, the intention is that the coagulation salt and, if appropriate, further reaction products of the same, be converted into insoluble forms after coagulation of the dispersion. The conversion of the soluble coagulation salt into its insoluble form can be achieved by means of exposure to heat, or to electromagnetic radiation, or sound, or chemicals. The water-solubility of the insoluble forms should be less than 6% by weight, preferably less than 1% by weight, and particularly preferably less than 0.25% by weight.

These insoluble forms are preferably intended to be non-hygroscopic and to comprise no transition metals, since these lead to oxidative degradation of organic polymers.

The cation of the coagulation salt is preferably selected from group IIa and IIIa of the Periodic Table of the Elements. Calcium and magnesium are particularly preferred.

The coagulant should preferably comprise no organic amines, such as primary, secondary, or tertiary amines, since these have a tendency to cause problems in relation to color and oxidative stability.

The coagulation process is carried out at temperatures of from −5° C. to 130° C., preferably from 10° C. to 110° C., particularly preferably from 15° C. to 100° C. In order to obtain the polymers in the coagulated polymer dispersion in the form of a compact mass, it can be necessary to "sinter" the coagulated polymer dispersion. "Sintering" means for the purposes of the present invention that the coagulated polymer dispersion is kept at the coagulation temperature for a prolonged period, or the coagulated polymer dispersion is heated to a temperature higher than the coagulation temperature and is kept at this temperature for a prolonged period. This period is usually from minutes to hours. The purpose of this measure is complete conversion of the coagulation salt into an insoluble form, and also to influence the nature of the polymer, in particular the grain size.

The anion of the coagulation salt is preferably $HCO_3^-$.

Typical examples of coagulants which meet these requirements are $Mg(HCO_3)_2$ or $Ca(HCO_3)_2$.

$Mg(HCO_3)_2$ solution is prepared via passage of $CO_2$ gas into an aqueous suspension of $Mg(OH)_2$:

$$Mg(OH)_2 + 2CO_2 \rightarrow Mg(HCO_3)_2.$$

This solution is directly used for coagulation of the polymer dispersion. The coagulated polymer dispersion is then heated above 60° C., and the magnesium hydrogencarbonate is converted into an insoluble salt.

This is followed by heating to from 60 to 130° C., preferably to from 80 to 130° C., particularly preferably to from 90 to 130° C., under isochoric conditions, whereupon almost all of the magnesium salt is precipitated.

However, the $Mg(CO_3H)_2$ solution can be stored prior to use for the coagulation process. The storage should take place at temperatures below 70° C., preferably below 60° C., and particularly below 30° C., in order to prevent any possible degradation.

In the case of calcium as cation of the coagulation salt, the process is analogous.

If a starting salt whose solubility in water is not particularly high is used for preparation of the $HCO_3$ salts, it is possible according to the present invention to add complexing agents, such as EDTA (ethylenediaminetetraacetic acid) before the $CO_2$ gas is passed through the salt solution.

The amount of coagulation salt amounts to less than 10% by weight, preferably less than 7% by weight, and particularly preferably less than 5% by weight, based in each case on the polymer to be coagulated.

The precise concentration of $Mg(HCO_3)_2$ depends on the respective dispersion intended for coagulation, on the amount and nature of the emulsifier, on the temperature, and on the desired eventual application. If the coagulated dispersion is intended to be used as impact modifier for polymers, the preferred amount of $Mg(HCO_3)_2$ is the minimum concentration needed to achieve complete coagulation. However, other concerns, such as deposits on the reactor wall, can also be important factors in selecting the minimum suitable concentration of coagulation salt.

According to the present invention, the concentration of $Mg^{2+}$ in the aqueous phase is usually above 10 mmol/l, preferably being from 30 mmol/l to 300 mmol/l, particularly preferably being from 25 to 150 mmol/l. If cations other than $Mg^{2+}$ are used, other concentrations can, if appropriate, prove particularly suitable.

According to a further embodiment of the present invention, it is possible to use more than one coagulation salt. In particular, a coagulation salt which during or after the coagulation process is converted to an insoluble form can be used together with at least one further coagulation salt which remains soluble during and after the coagulation process. In this type of case, the amount of coagulation salt which is converted into an insoluble form during or after the coagulation process can be reduced. This can be necessary in certain circumstances if the coagulation salt converted to its insoluble form and remaining in the polymer dispersion leads to impairment of mechanical properties (such as toughness and tensile strain at break) when used as impact modifier. By way of example, $Mg(HCO_3)_2$ can be used as coagulation salt which is converted to its insoluble form prior to or during the coagulation process in combination with the coagulation salts $MgSO_4$ or $CaCl_2$, which remain in the solution.

Furthermore, the coagulation process according to the present invention can be carried out with more than one coagulation salt which is converted to an insoluble form during or after the coagulation process. For example, it is also possible to use, for the coagulation process, a mixture composed of one or more coagulation salts which are converted to an insoluble form during or after the coagulation process and of one or more coagulation salts which remain in dissolved form.

According to the invention, the coagulation process can be carried out batchwise or continuously. By way of example, the coagulation process can take place in a first reactor, and, if appropriate, be followed by the "sintering" of the coagulated polymer dispersion in a second reactor.

After coagulation, the solid fractions of the dispersion are to some extent mechanically dewatered, for example via centrifuging, squeezing, if appropriate in a mechanical press of in a screw extruder, or via heating or heating with application of vacuum. In the two last instances, the solid fractions can be completely dewatered. It is preferable that the coagulated polymer dispersion is not completely dewatered. The coagulated polymer dispersion particularly preferably comprises from 5 to 40% by weight of residual water, and very particularly preferably from 10 to 40% by weight of residual water.

The completely or partially dried polymer can then be mixed in an extruder or kneader with a polymer melt composed of a second or of a plurality of further polymer(s), in order to prepare molding compositions. According to EP 0 993 476, a portion of the water can be removed in the extruder before the coagulated product comes into contact with the polymer melt. After mixing with the polymer melt, the water is removed via vaporization in the extruder. The second polymer used preferably comprises PSAN, PMMA, or PVC.

The coagulation salt(s) converted to an insoluble form during or after the coagulation process can be used as filler. In this case, significantly more coagulation salt is used. The amount to be selected of coagulation salt depends on the desired end uses. In the case of use as filler, the amount of coagulation salt needed in the final product in its insoluble form, based on the total weight of the final product is usually more than 2% by weight, preferably more than 5% by weight, and particularly preferably more than 10% by weight. This final product can either be the coagulated polymer dispersion or a mixture of the coagulated polymer dispersion with one or more polymers. By way of example, this is the case when the coagulated polymer dispersion is used as impact modifier. When the polymer dispersions coagulated according to the inventive process are used as impact modifier, these are usually used in conjunction with PSAN, PMMA, PVC, PS, PSAN-MMA, or other thermoplastics. In particular, preference is given to the use of a coagulation salt according to the present invention comprising $Mg(HCO_3)_2$, when the coagulated polymer dispersion is intended to be processed together with polyvinyl chloride, since the $MgCO_3$ formed during the coagulation process can serve as HCl scavenger in this case.

The coagulated polymer dispersion can also be used for the production of goods composed of rubber with fillers, for example for tires. Here again, $MgCO_3$ can be used as filler.

According to a further embodiment of the present invention, the coagulation salt converted into an insoluble form during or after the coagulation process can be used as pigment or as UV stabilizer. In these cases, the ideal amount of coagulation salt is from 0.1 to 5% by weight, based on the final product.

The invention also provides the molding compositions prepared by the process described above.

Surprisingly, the molding compositions prepared by the inventive process exhibit relatively low yellowness index, relatively low water absorption, and, in the case of transparent products, relatively little tendency toward haze during use, in particular in high humidity or in the presence of water.

The molding compositions prepared according to the invention can be processed by the known methods of thermoplastics processing, e.g. extrusion, injection molding, rolling, calendering, blow molding, compression molding, or sintering, to give moldings, semifinished products, foils, foams, or fibers.

EXAMPLES

Example A

Demonstration of the Underlying Principle

Polymer Dispersion Used
Polymer Dispersion 1

An aqueous polymer dispersion was prepared from graft copolymers. The graft copolymer particles were composed of 60% by weight of a crosslinked n-butyl acrylate rubber as core and 40% by weight of a shell composed of polystyrene and poly(styrene-co-acrylonitrile), the styrene:acrylonitrile ratio being 75:25. The solids content of the dispersion was 35% by weight. The emulsifier used was a sodium salt of $C_{10}$-$C_{16}$-alkylsulfonic acid mixture (K30® emulsifier from Bayer). The polymerization was carried out using $K_2S_2O_8$ as initiator. The $K_2S_2O_8$ is reduced to $K_2SO_4$ during the course of the reaction.

Example A-Comp1

Prior Art: Coagulation Using Coagulation Salt

Polymer dispersion 1 was coagulated via addition of 2 parts of an aqueous magnesium sulfate solution (0.5% by weight). The coagulated polymer dispersion was then filtered and the solids content of the filtrate was determined via heating to constant weight at 200° C. The solids content in the water was 0.56% by weight.

Example A-Comp2

Prior Art Coagulation Via Shear (without Coagulation Salt)

Polymer dispersion 1 was coagulated via application of high shear Janke & Kunkel IKA-Labortechnik Ultraturrax T50 at 10 000 rpm without addition of salt. The coagulated polymer dispersion was then filtered and the solids content of the filtrate was determined via heating to constant weight at 200° C. The solids content in the water was 0.11% by weight here.

Example A-1

Inventive Process: Coagulation Using Coagulation Salt and Conversion of Coagulation Salt to an Insoluble Derivative Polymer dispersion 1 was coagulated at 60° C. via addition of an aqueous solution of 0.6% by weight of $Mg(HCO_3)_2$, and then heated to 95° C. The coagulated dispersion was filtered and the solids content of the filtrate was determined by heating to constant weight at 200° C. The solids content of the water was 0.11% by weight. (The $Mg^{2+}$ concentration resulting from 0.6% by weight of magnesium hydrogencarbonate is the same as that resulting from 0.5% by weight of magnesium sulfate.).

A Mettler Toledo® HR73 halogen moisture analyzer was used to determine the solids content of the filtrate.

The calculated theoretical value for the minimum salt concentration in the filtrate is 0.11% by weight (emulsifier, buffer salts, and initiator). This agrees with the experimentally determined value for the specimen without addition of coagulation salt, and also for the inventively coagulated specimen. This shows that all of the magnesium hydrogencarbonate has indeed been converted into an insoluble derivative after the inventive process.

Example B

Effect of Temperature and of Stirrer Speed:
(According to the Invention and Prior Art)

Polymer Dispersion Used
Polymer Dispersion 2

An aqueous polymer dispersion was prepared from a graft copolymer using 35% by weight solids content. The graft copolymer particles were composed of 60% by weight of a crosslinked n-butyl acrylate rubber as core with a first grafted-on shell composed of polystyrene, making up 13% by weight of the graft copolymer, and with a second shell composed of a polystyrene-acrylonitrile copolymer using a styrene:acrylonitrile ratio of 75:25. The proportion of the second shell, based on the total weight of the polymer, was 27% by weight. The emulsifier used was a sodium salt of a $C_{10}$-$C_{16}$-alkyl-sulfonic acid mixture (K30® emulsifier from Bayer). The concentration of the emulsifier was 1% by weight, based on the graft copolymer. The particle size distribution of the polymer dispersion was monodisperse with an average value of 500 nm.

Preparation of Mg $(HCO_3)_2$ $CO_2$ is added under a pressure of 2.5 bar to a 0-0.8% strength by weight aqueous dispersion of $Mg(OH)_2$ (corresponding after the reaction to a concentration of 2% by weight of $Mg(HCO_3)_2$ in a sealed vessel, and the mixture is stirred at room temperature. This mixture was then diluted to the necessary concentration with water.

Method for Coagulation of the Polymer Dispersion

The coagulation process was carried out in a Chemspeed® reactor from Chemspeed Technologies, Rheinstraße 32, CH-4302 Augst. The Chemspeed® reactor was composed of a plurality of 100 ml stainless steel reactors equipped with anchor stirrers. The reaction volume was 70 ml. For each experiment, 32 ml of polymer dispersion 2 were charged to the reactors and heated, with stirring at 100 rpm (revolutions per minute) to coagulation temperature. Once coagulation temperature had been reached, 38 ml of the coagulation solution were added within a period of 46 minutes. In the case of experiments B-1 to B-comp9, $Mg(HCO_3)_2$ was used as coagulation salt. In the case of experiments B-comp10 to -comp21, $MgSO_4$ was used as coagulation salt. Once addition of the coagulation salt had ended, the reaction mixtures were kept at 100° C. for 80 minutes and then cooled to room temperature. The coagulated graft polymer was isolated from the liquid phase via filtration by means of a filter paper, and the magnesium content of the filtrate was determined by titration.

Determination of $Mg^{2+}$ Concentration $Mg^{2+}$ concentration in the aqueous phase after isolation of the coagulated graft copolymer via filtration was determined by titration with Na-EDTA solution (disodium ethylenediaminetetraacetate). For this, 25 g of the filtered aqueous phase with 25 ml of a 0.5% strength by weight ammonium hydroxide solution and an indicator-buffer tablet (ammonium chloride+hexamethylenetetramine) were titrated with a 0.1 molar Na-EDTA solution until the color changed from red to green.

Experiments B-1 to B-12 were carried out using $Mg(HCO_3)_2$ as coagulation salt and polymer dispersion 2. Experiments B-comp1 to B-comp9 were carried out for comparison therewith in the absence of the polymer dispersion, and experiments B-comp10 to B-comp21 were carried out with $MgSO_4$ in the presence of the polymer dispersion, likewise for comparison.

In the three groups of experiments, stirrer speed, Mg concentration, and also coagulation temperature, were varied.

TABLE 1

Coagulation as a function of T, Mg concentration, and stirrer speed

| Example No. | Concentration of salt solution, % by wt. $Mg(HCO_3)_2$ | $MgSO_4$ | Stirrer speed rpm | Temperature °C. | Mg concentration in filtrate, % by wt. |
|---|---|---|---|---|---|
| B-1 | 1.80% | | 100 | 90 | not filterable |
| B-2 | 1.80% | | 200 | 90 | not filterable |
| B-3 | 1.80% | | 300 | 90 | 0.030 |
| B-4 | 1.80% | | 400 | 90 | 0.018 |
| B-5 | 1.80% | | 200 | 60 | 0.025 |
| B-6 | 1.80% | | 200 | 70 | 0.035 |
| B-7 | 1.80% | | 200 | 80 | 0.028 |
| B-8 | 1.80% | | 200 | 90 | 0.023 |
| B-9 | 2.00% | | 200 | 90 | 0.023 |
| B-10 | 1.80% | | 200 | 90 | 0.023 |
| B-11 | 1.60% | | 200 | 90 | 0.025 |
| B-12 | 1.40% | | 200 | 90 | 0.035 |
| B-comp1 | 1.80% | | 100 | 90 | 0.00 |
| B-comp2 | 1.80% | | 200 | 90 | 0.00 |
| B-comp3 | 1.80% | | 400 | 90 | 0.00 |
| B-comp4 | 1.80% | | 200 | 90 | 0.00 |
| B-comp5 | 1.80% | | 200 | 90 | 0.00 |
| B-comp6 | 1.80% | | 200 | 90 | 0.00 |
| B-comp7 | 1.80% | | 200 | 60 | 0.00 |
| B-comp8 | 1.80% | | 200 | 70 | 0.00 |
| B-comp9 | 1.80% | | 200 | 80 | 0.00 |
| B-comp10 | | 1.48% | 100 | 90 | 0.19 |
| B-comp11 | | 1.48% | 200 | 90 | 0.19 |
| B-comp12 | | 1.48% | 300 | 90 | 0.19 |
| B-comp13 | | 1.48% | 400 | 90 | 0.19 |
| B-comp14 | | 1.48% | 200 | 60 | 0.19 |
| B-comp15 | | 1.48% | 200 | 70 | 0.19 |
| B-comp16 | | 1.48% | 200 | 80 | 0.19 |
| B-comp17 | | 1.48% | 200 | 90 | 0.19 |
| B-comp18 | | 1.64% | 200 | 90 | 0.21 |
| B-comp19 | | 1.48% | 200 | 90 | 0.19 |
| B-comp20 | | 1.32% | 200 | 90 | 0.17 |
| B-comp21 | | 1.15% | 200 | 90 | 0.15 |

When $Mg(HCO_3)_2$ was used as coagulation salt, the amount of Mg in the filtrate is about 8 times lower than when $MgSO_4$ is used as coagulation salt. When the experiments are carried out in the absence of the polymer dispersion, the soluble $Mg(HCO_3)_2$ is converted entirely to the insoluble product $Mg(CO_3)$. The size of the $MgCO_3$ particles produced in the absence of the polymer dispersion in examples B-comp1 to B-comp9 is in the range from 30 to 50 μm. The sizes of the $MgCO_3$ particles produced in the presence of the polymer dispersion during the coagulation process are markedly smaller (B1-B12).

Example C

Large-Scale Coagulation

Example C-Comp1

Prior Art 240 kg of a 1.48% strength by weight $MgSO_4$ solution were charged to a reactor whose volume was 1600 l and were heated to 75° C. 200 kg of polymer dispersion 2 were then added, with stirring at 50 rpm, within a period of 5 minutes. The stirrer speed was increased to 90 rpm, and the temperature was kept at 75° C. for 30 minutes. Steam was introduced into the reactor in order to heat the coagulated dispersion to 88° C. within a period of 10 minutes. The temperature was kept at 88° C. for 30 minutes. The mixture was then heated to 130° C. within a period of 16 minutes, and this temperature was maintained for 80 minutes. The reactor was cooled, and the solid was isolated from the liquid by centrifuging.

$Mg^{2+}$ concentration in the aqueous phase after coagulation and centrifuging was 0.16% by weight.

Example C-1

Inventive Process

Coagulation Using Coagulation Salt and Conversion of Coagulation Salt to an Insoluble Derivative The example was carried out as described above, but instead of $MgSO_4$, $Mg(HCO_3)_2$ was used according to the invention as coagulation salt. $Mg^{2+}$ concentration, based on the polymer dispersion, was the same in both examples.

$Mg^{2+}$ concentration in the aqueous phase after coagulation and centrifuging was 0.003% by weight.

Example D

Coagulation of a Polybutadiene Dispersion

Polymer Dispersion 3

An aqueous dispersion of a graft copolymer was prepared from 62% by weight of butadiene as core and poly(styrene-co-acrylonitrile) using a styrene:acrylonitrile ratio of 75:25 as shell. The emulsifier used comprised 1% by weight of potassium stearate, based on graft copolymer content. The particle size distribution was polydisperse, with average particle size of 0.35 μm.

Example D-comp1

Prior Art: Coagulation Using Coagulation Salt 9.6 kg of a 1.48% strength by weight $MgSO_4$ solution were charged to a stainless steel reactor of capacity 40 l. 8.0 kg of polymer dispersion 3 were added to this. The reactor was heated to 98° C. and kept at this temperature for 10 minutes. It was then heated to 124° C. by adding steam and kept at this temperature for 30 minutes. The reactor was cooled, and the solids were separated from the liquid phase by centrifuging.

$Mg^{2+}$ concentration in the aqueous phase after coagulation and centrifuging was 0.16% by weight.

Example D-1

Inventive Process

Coagulation Using Coagulation Salt and Conversion of Coagulation Salt to an Insoluble Derivative The experiment described above was carried out using $Mg(HCO_3)_2$ solution instead of $MgSO_4$ solution. $Mg(HCO_3)_2$ concentration was adjusted in such a way that $Mg^{2+}$ concentration, based on the polymer dispersion, was the same in both experiments.

$Mg^{2+}$ concentration of the aqueous phase after coagulation and centrifuging was 0.003% by weight.

Comparison of G-comp1 with C-1 and of D-comp1 with D-1 shows clearly that most of the coagulation salt used remains in the coagulated polymer after the inventive process. $Mg^{2+}$ concentration is markedly higher in the aqueous phases of the polymer dispersions coagulated using $MgSO_4$ than in the aqueous phases of the polymer dispersions coagulated by the inventive process.

Example E

Polymer Dispersion 4

An aqueous dispersion was prepared using graft copolymer content of 36% by weight. The graft copolymer was composed of 80% by weight of a butadiene-co-styrene copolymer using a butadiene:styrene ratio of 73:27 as core. A first shell of a polymethyl methacrylate-co-styrene using a ratio by weight of 67:33 had been grafted onto this core. A second shell composed of methyl methacrytate and butyl acrylate using a ratio by weight of 85:15 had been grafted onto the graft copolymer. The proportion by weight of both the first and the second shell, based on the total weight of the graft copolymer, was in each case 10% by weight. The polymer dispersion was stabilized using Na stearate at a concentration of 1% by weight, based on the graft copolymer. The polymer dispersion exhibited monodisperse particle size distribution with average particle size of 140 nm.

Example E-Comp1

Prior Art: Coagulation Using Coagulation Salt 13.2 kg of a 1.1% strength by weight $MgSO_4$ solution were charged to a stainless steel reactor and heated to 50° C. 11.0 kg of polymer dispersion 4 were then added. The reactor was heated to 99° C. and kept at this temperature for 25 minutes. The reactor was then cooled; and the solids were separated from the aqueous phase by centrifuging.

Example E-1

Inventive Process: Coagulation Using Coagulation Salt and Conversion of Coagulation Salt to an Insoluble Derivative The experiment was repeated according to the process described in E-comp-1, except that $Mg(HCO_3)_2$ was used instead of $MgSO_4$ as coagulation salt. The concentration of the $Mg(HCO_3)_2$ solution used was adjusted in such a way that the same $Mg^{2+}$ concentration was present in Examples E-comp1 and E-1.

Properties of Coagulated Polymers

Test specimens composed of mixtures of the coagulated polymers with SAN were produced for determination of the properties of the polymers treated via coagulation of the polymer dispersion after the polymerization process. With the exception of the moldings for determining haze in the presence of water, the SAN used was prepared as follows:

Preparation of SAN for Examples 3 and 4:

A monomer mixture composed of styrene and acrylonitrile was polymerized in solution under conventional conditions known to the person skilled in the art. The acrylonitrile content of the resultant SAN styrene-acrylonitrile copolymer was 35% by weight, based on the copolymer, and its viscosity number VN was 80 ml/g.

Production of Test Specimens:

In each case, 30% by weight of components C-1 and, respectively, C-comp1 (impact modifier) were homogenized with 70% by weight of SAN (thermoplastic) in a ZSK30 twin-screw extruder from Werner & Pfleiderer and from 240 to 290° C., and extruded into a water bath. The extrudates were palletized and dried. The pellets were used in an injection-molding machine to produce test specimens with 270° C. melt temperature and 60° C. mold surface temperature.

1. Water Absorption

Each of the graft copolymers obtained after Examples C-comp1 (prior art) and C-1 (according to the invention) were mixed in a twin-screw extruder, after separation from the aqueous phase by centrifuging, with polystyrene-co-acrylonitrile in a ratio by weight of 35% by weight of graft copolymer (100%) to 65% by weight of polystyrene-co-acrylonitrile. Polymer dispersions C-comp1 and C-1 were used in moist form, i.e. inclusive of the water not removed by centrifuging. This water was removed by way of apertures along the extruder. The polymer melt was extruded, pelletized, and cooled. The pellets were molded to give plaques at 260° C. by injection molding with 60° C. mold temperature. After cooling, the plaques were stored in a heated water bath at 60° C. for five days. Water absorption of the polymers was determined via weighing of the plaques prior to and after storage in the water bath.

Water absorption by the polymer mixture (prior art) prepared from polymer dispersion C-comp1 was 1.7% by weight of the initial weight. In contrast, water absorption by the polymer mixture (according to the invention) prepared from polymer dispersion C-1 was 1.1% by weight of its initial weight. Water absorption is important for possible warpage of the polymers, and also for electrical properties.

2. Haze in the Presence of Water for Transparent Polymer Mixtures

Coagulated polymer dispersions E-comp1 (prior art) and E-1 (according to the invention) were mixed, after centrifuging, with polystyrene-co-acrylonitrile a ratio by weight of 30% by weight of polymer from the coagulated polymer dispersion to 70% by weight of polystyrene-co-acrylonitrile (S/AN 81/19% by weight) and polymethyl methacrylate (Plexiglas 6N). The ratio of polystyrene-co-acrylonitrile to polymethyl methacrylate was 1.04:1. The ratio of PMMA to SAN was selected in such a way that the matrix is isorefractive with respect to the graft copolymer, the polymer mixture being transparent at room temperature. The two mixtures were then stored in water at 60° C. overnight. The polymer mixture prepared from polymer dispersion E-comp1 developed marked haze, but in contrast the polymer mixture composed of E-1 remained transparent.

3. Mechanical Properties

For determination of mechanical properties of polymer mixtures composed of coagulated polymer dispersions and thermoplastics, two polymer mixtures were prepared, in each case of from 70% by weight of SAN as thermoplastic with 30% by weight of graft copolymer C-1 (according to the invention) and C-comp1 (prior art) as impact modifier. Table 2 lists the results. The impact modifiers coagulated according to the invention using $Mg(HCO_3)_2$ and then processed with polymers to give polymer mixtures (C-1) exhibited mechanical properties (modulus of elasticity, yield point, thermal stability, and notched impact resistance) similar to those polymer mixtures which comprised impact modifiers coagulated using $MgSO_4$ (C-comp1).

4. Yellowness Index

Yellowness index was determined on the polymer mixtures described in 4. The mixtures which comprised graft copolymer coagulated according to the inventive process using $Mg(HCO_3)_2$ exhibited a lower yellowness index than polymer mixtures prepared from polymer dispersions coagulated using $MgSO_4$, as shown in table 2.

TABLE 2

Notched impact resistance, modulus of elasticity, MVR, Vicat B50, and yellowness index of test specimens composed of mixtures of SAN with C-1 and, respectively, C-comp1

| Physical variable | Method | C-1 (according to the invention) | C-comp1 (prior art) |
|---|---|---|---|
| Notched impact resistance (23° C.) [kJ/m²] | ISO 179-2/1eA(F) | 8.9 | 7.0 |
| Modulus of elasticity [MPa] (tensile test at rate of 1 mm/min; 23° C.) | ISO 527-2:1993 | 2410 | 2405 |
| MVR (220/10) [mL/10 min] | ISO 1133/B | 5.7 | 6.0 |
| Vicat B50 [° C.] | ISO 306/B | 102.1 | 101.8 |
| Yellowness index | D1925-70 C/10° | 25.2 | 28.8 |

We claim:

1. A process, with the aid of a coagulation salt, for coagulation of an aqueous polymer dispersion comprising a polymer, stabilized via one or more dispersing agents, which comprises, during or after the coagulation, converting the coagulation salt from a dissolved from to an insoluble form, wherein the water solubility of the insoluble form being less than 6% by weight, wherein the $HCO_3$ is selected as anion of the coagulation salt, and wherein together with the coagulation salt with $HCO_3$ as its anion which is converted from the dissolved form to the insoluble form, at least one further coagulation salt is used which remains in the dissolved form after the coagulation process.

2. The process according to claim 1, wherein the coagulation salt with $HCO_3$ as its anion is converted into the insoluble salt form via exposure to heat or to electromagnetic radiation, or sound, or chemicals.

3. The process according to claim 1, wherein the dispersing agents have a sterically or electrostatically stabilizing action.

4. The process according to claim 3, wherein the dispersing agents have been selected from the group of anionic, cationic, nonionic, or amophoteric surfactants.

5. The process according to claim 4, wherein the dispersing agent is an anionic surfactant or a mixture composed of anionic and nonionic surfactants.

6. The process according to claim 1, wherein a cation of the coagulation salt is selected from the group IIa or IIIa of the Periodic Table of the Elements.

7. The process according to claim 6, wherein the cation of the coagulation salt is selected from the group of alkaline earth elements.

8. The process according to claim 7, wherein the cation is magnesium.

9. The process according to claim 7, wherein the cation is calcium.

10. The process according to claim 1, wherein the dissolved $HCO_3$ salt is converted to the corresponding insoluble carbonate salt via heating to from 60 to 130° C.

11. The process according to claim 1, wherein the polymer in the polymer dispersion is formed from one or more monomers selected from the following group: butadiene, isoprene, alkyl acrylates, methacrylates, styrene and its derivatives, vinyl chloride, unsaturated fatty acids and their derivatives, acrylates, methacrylates, epoxides, amides, anhydrides, acrylonitrile, and methacrylonitrile.

12. The process according to claim 11, wherein the polymer in the polymer dispersion comprises polybutyl acrylate or polybutadiene.

13. A process for preparation of molding compositions, which comprises, after partial to complete removal of water, mixing/processing, in a melt, the polymer dispersion coagulated according to claim 1 with a second or with a plurality of further polymer(s).

14. The process according to claim 13, wherein the water content of the coagulated polymer dispersion is from 5 to 40% by weight.

15. The process according to claim 13, wherein the second polymer comprises PSAN, PMMA, or PVC.

16. A molding composition obtained by the process according to claim 12.

17. A molding, a semifinished product, a fiber, a foam, or a foil composed of the molding composition according to claim 16.

18. The process according to claim 14, wherein the water content of the coagulated polymer dispersion is from 10 to 40% by weight.

* * * * *